W. C. KING.

Covered-Jars.

No. 6,222.

Reissued Jan. 12, 1875.

*Witnesses:*
James Martin Jr.
J. N. Campbell.

*Inventor:*
William C. King
by
Mason Fenwick & Lawrence
Attys.

UNITED STATES PATENT OFFICE.

WILLIAM C. KING, OF PITTSBURG, PENNSYLVANIA.

IMPROVEMENT IN COVERED JARS.

Specification forming part of Letters Patent No. 134,072, dated December 17, 1872; reissue No. 6,222, dated January 12, 1875; application filed November 2, 1874.

*To all whom it may concern:*

Be it known that I, WILLIAM C. KING, of Pittsburg, county of Allegheny and State of Pennsylvania, have invented an Improvement for Temporarily Fastening the Covers on Vessels; and I do hereby declare that the following is a full, clear, and exact description thereof, reference being had to the accompanying drawing, making part of this specification, in which—

Figure 1:
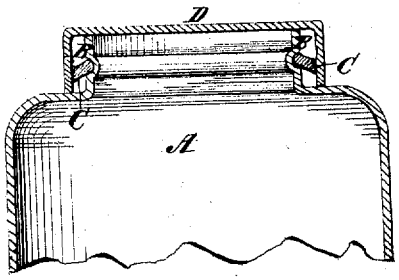
Figure 2:
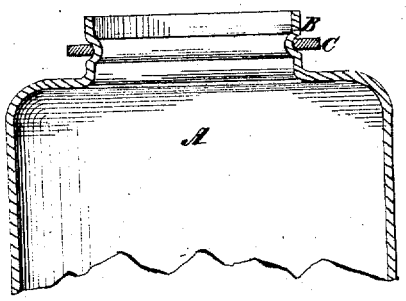

Figure 1 is a vertical section of the upper portion of a glass vessel with a cover on it. Fig. 2 is a similar section of the same with the cover removed.

The nature of my invention consists in a vessel, a cover, and an elastic ring, constructed and combined in such a manner that the cover can be pulled off and put on without any manipulation of screws, wedges, &c., to slacken the bearing of the cover upon the vessel, and yet will, when on, close the joint between the cover and vessel sufficiently tight to exclude dust, vapors, and small vermin.

In the accompanying drawing, A represents the vessel; B, a groove near the mouth of the vessel, and C a gum or other elastic ring placed in the groove. This ring is made much broader than it is thick, in order that it shall have great flexibility when deflected from a horizontal plane, while it possesses its usual compressible and expansible property. When this ring is in the groove a large portion of its width projects out beyond the outer surface of the vessel, as represented. D is the cover of the vessel. It is of a much greater diameter than the outer surface of the top of the vessel, but of a little less diameter than the ring.

In operating with this vessel the act of putting on the cover causes a slight depression from a horizontal plane and a compression of the rubber ring, as illustrated in Fig. 1, and by this means a close joint and a gentle bind and hold between the vessel and its cover are secured, and thus dust and other impurities excluded.

By providing a vessel having a flanged cover with a flexible pliant band, which is so constructed and arranged that a large portion of its width projects outward from the outer wall of the vessel, and bears with its edge against the inner surface of the flange of the cover, the irregularities in the flange of the cover (nearly always found in covers of glass vessels) will be filled by the band settling into the same, and by this means dust and vapors will be excluded from the vessel, and the contents thereof kept in the desired condition without hermetically sealing the vessel—a process always attended with labor and trouble, both in closing and opening the vessel, and which is wholly unsuited for vessels which are required to be opened and closed quickly and frequently.

What I claim as my invention, and as a new article of manufacture, is—

A vessel having a flanged cover, and provided with a pliant and yielding band, which is much wider than it is thick, and arranged between the vessel and flange of the cover, the greater portion of the width of the band projecting outward and beyond the outer wall of the vessel, and bearing elastically with its edge against the flange of the cover, said projecting portion readily yielding downwardly and upwardly to the pressure and pull of the hand upon the cover, all for the purpose of forming an easy separating-joint, and at the same time excluding dust and destructive agents without the necessity of hermetically sealing the vessel, substantially as described.

WM. C. KING.

Witnesses:
WILLIAM F. ROBB,
GEO. M. IRWIN.